(12) United States Patent
Watanabe et al.

(10) Patent No.: US 12,202,923 B2
(45) Date of Patent: Jan. 21, 2025

(54) NITRILE-GROUP-CONTAINING COPOLYMER RUBBER

(71) Applicant: ZEON CORPORATION, Tokyo (JP)

(72) Inventors: Yasuaki Watanabe, Tokyo (JP); Kunihiro Goto, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 378 days.

(21) Appl. No.: 17/772,770

(22) PCT Filed: Oct. 28, 2020

(86) PCT No.: PCT/JP2020/040508
§ 371 (c)(1),
(2) Date: Apr. 28, 2022

(87) PCT Pub. No.: WO2021/090748
PCT Pub. Date: May 14, 2021

(65) Prior Publication Data
US 2022/0411555 A1   Dec. 29, 2022

(30) Foreign Application Priority Data
Nov. 5, 2019 (JP) .................. 2019-200731

(51) Int. Cl.
*C08F 236/12* (2006.01)
(52) U.S. Cl.
CPC ........ *C08F 236/12* (2013.01); *C08F 2800/20* (2013.01); *C08F 2810/20* (2013.01)
(58) Field of Classification Search
CPC .... C08F 236/06; C08F 236/08; C08F 220/44; C08F 220/28; C08F 220/10
See application file for complete search history.

(56) References Cited

U.S. PATENT DOCUMENTS

| | | | |
|---|---|---|---|
| 6,812,312 B1 * | 11/2004 | Ito | .............. C08K 5/14 526/335 |
| 2004/0097660 A1 | 5/2004 | Bender et al. | |
| 2018/0134831 A1 * | 5/2018 | Shiono | ............ C08L 19/00 |

FOREIGN PATENT DOCUMENTS

| | | | |
|---|---|---|---|
| CN | 107531852 A | | 1/2018 |
| JP | H0673220 | * | 3/1994 |
| JP | 2004-506087 A | | 2/2004 |
| WO | 2016/190214 A1 | | 12/2016 |
| WO | 2019/049855 A1 | | 3/2019 |

OTHER PUBLICATIONS

Translation of JPH0673220 (Year: 1994).*
Jan. 12, 2021 International Search Report issued in International Patent Application No. PCT/JP2020/040508.
Nov. 2, 2023 Extended European Search Report issued in European Patent Application No. 20885228.5.

* cited by examiner

*Primary Examiner* — Robert C Boyle
(74) *Attorney, Agent, or Firm* — Oliff PLC

(57) ABSTRACT

A nitrile-group-containing copolymer rubber, including 15% by weight or more and less than 28% by weight of α,β-ethylenically unsaturated nitrile monomer units (a), 10 to 50% by weight of α,β-ethylenically unsaturated monocarboxylic acid ester monomer units (b), 22 to 74% by weight of conjugated diene monomer units (c), and 1 to 10% by weight of carboxyl group-containing monomer units (d) and having an iodine value of 120 or less, wherein the conjugated diene monomer units (c) are at least partially hydrogenated, and the proportion of isoprene units in the conjugated diene monomer units (c) is 5% by weight or more and less than 33% by weight.

6 Claims, No Drawings

NITRILE-GROUP-CONTAINING COPOLYMER RUBBER

TECHNICAL FIELD

The present invention relates to a nitrile-group-containing copolymer rubber, and more specifically relates to a nitrile-group-containing copolymer rubber which can provide a cross-linked rubber excellent in cold resistance, resistance to swelling in oil, and resistance to hardening in oil.

BACKGROUND ART

Partially saturated nitrile-group-containing copolymer rubbers, for example, typically, hydrogenated acrylonitrile-butadiene copolymer rubbers are more excellent in heat resistance, oil resistance, ozone resistance, and the like than those of common nitrile-group-containing copolymer rubbers having a plenty of unsaturated carbon-carbon bonds in the main chain structure thereof, such as acrylonitrile-butadiene copolymer rubbers. However, depending on the nitrile group content, the proportion of unsaturated bonds in carbon-carbon bonds, and the like, some of these partially saturated nitrile-group-containing copolymer rubbers may have reduced cold resistance compared to those of common nitrile-group-containing copolymer rubbers.

To such circumstances, Patent Document 1 discloses a partially saturated nitrile-group-containing copolymer rubber, comprising unsaturated nitrile monomer units, butadiene monomer units, and isoprene monomer units with a molar ratio of the butadiene monomer units to the isoprene monomer units of 3 to 1 or less. In the description of Patent Document 1, the partially saturated nitrile-group-containing copolymer rubber may contain a different copolymerizable monomer, such as unsaturated acid or an ester of an unsaturated acid, usually in an amount of not more than about 103. However, the partially saturated nitrile-group-containing copolymer rubber according to Patent Document 1 provides a cross-linked rubber having cold resistance improved to sane extent while having insufficient resistance to swelling in oil and insufficient resistance to hardening in oil.

RELATED ART DOCUMENTS

Patent Documents

Patent Document 1: National Publication of International Patent Application No. 2004-506087

SUMMARY OF THE INVENTION

Problem to be Solved by the Invention

The present invention has been made in view of such circumstances, and an object of the present invention is to provide a nitrile-group-containing copolymer rubber which can provide a cross-linked rubber excellent in cold resistance, resistance to swelling in oil (small volume change in oil), and resistance to hardening in oil (small hardness change in an oil containing a condensed aromatic compound).

Means for Solving Problems

The present inventors, who have conducted extensive research to achieve the above object, have found that the object can be achieved by a nitrile-group-containing copolymer rubber comprising 15% by weight or more and less than 283 by weight of $\alpha,\beta$-ethylenically unsaturated nitrile monomer units, 10 to 50% by weight of $\alpha,\beta$-ethylenically unsaturated monocarboxylic acid ester monomer units, 22 to 74% by weight of conjugated diene monomer units, and 1 to 10% by weight of carboxyl group-containing monomer units, and having an iodine value of 120 or less, wherein the proportion of isoprene units in the conjugated diene monomer units is 5% by weight or more and less than 33% by weight, and have completed the present invention.

Namely, the present invention provides a nitrile-group-containing copolymer rubber, comprising 15% by weight or more and less than 28% by weight of $\alpha,\beta$-ethylenically unsaturated nitrile monomer units (a), 10 to 50% by weight of $\alpha,\beta$-ethylenically unsaturated monocarboxylic acid ester monomer units (b), 22 to 74% by weight of conjugated diene monomer units (c), and 1 to 10% by weight of carboxyl group-containing monomer units (d), and having an iodine value of 120 or less, wherein the conjugated diene monomer units (c) are at least partially hydrogenated, and the proportion of isoprene units in the conjugated diene monomer units (c) is 5% by weight or more and less than 33% by weight.

In the nitrile-group-containing copolymer rubber according to the present invention, the conjugated diene monomer units (c) preferably comprise isoprene units and 1,3-butadiene units.

In the nitrile-group-containing copolymer rubber according to the present invention, the carboxyl group-containing monomer units (d) are preferably $\alpha,\beta$-ethylenically unsaturated dicarboxylic acid monoester monomer units.

In the nitrile-group-containing copolymer rubber according to the present invention, the $\alpha,\beta$-ethylenically unsaturated monocarboxylic acid ester monomer units (b) are preferably formed of a (meth)acrylic acid ester having a $C_2$ to $C_{18}$ alkoxyalkyl group.

The present invention also provides a cross-linkable rubber composition, comprising the nitrile-group-containing copolymer rubber and a cross-linking agent.

Furthermore, the present invention provides a cross-linked rubber prepared by cross-linking the cross-linkable rubber composition.

Effects of Invention

The present invention can provide a nitrile-group-obtaining copolymer rubber which can provide a cross-linked rubber excellent in cold resistance, resistance to swelling in oil (small volume change in oil), and resistance to hardening in oil (small hardness change in an oil containing a condensed aromatic compound), and a cross-linked rubber which is prepared from such a nitrile-group-containing copolymer rubber and is excellent in cold resistance, resistance to swelling in oil, and resistance to hardening in oil.

DESCRIPTION OF EMBODIMENTS

Nitrile-Group-Containing Copolymer Rubber

The nitrile-group-containing copolymer rubber according to the present invention comprises 15% by weight or more and less than 28% by weight of $\alpha,\beta$-ethylenically unsaturated nitrile monomer units (a), 10 to 50% by weight of $\alpha,\beta$-ethylenically unsaturated monocarboxylic acid ester monomer units (b), 22 to 74% by weight of conjugated diene monomer units (c), and 1 to 10% by weight of carboxyl group-containing monomer units (d) and having an iodine value of 120 or less, wherein the conjugated diene monomer units (c) are at least partially hydrogenated, and the proportion of isoprene units in the conjugated diene monomer units (c) is 5% by weight or more and less than 33% by weight.

Any α,β-ethylenically unsaturated compound having a nitrile group can be used as an α,β-ethylenically unsaturated nitrile monomer for forming the α,β-ethylenically unsaturated nitrile monomer units (a) without limitation, and examples thereof include acrylonitrile; α-halogenoacrylonitriles such as α-chloroacrylonitrile, and α-bromoacrylonitrile; α-alkylacrylonitriles such as methacrylonitrile and ethacrylonitrile; and the like. Among these, preferred are acrylonitrile and methacrylonitrile, and particularly preferred is acrylonitrile. These α,β-ethylenically unsaturated nitrile monomers can be used alone or in combination.

In the nitrile-group-containing copolymer rubber according to the present invention, the content of α,β-ethylenically unsaturated nitrile monomer units (a) in the total monomer units is 15% by weight or more and less than 28% by weight, preferably 18% by weight or more and 27% by weight or less, more preferably 20% by weight or more and 26% by weight or less, still more preferably 22% by weight or more and 26% by weight or less. A significantly small content of α,β-ethylenically unsaturated nitrile monomer units (a) results in a cross-linked rubber having reduced resistance to swelling in oil. In contrast, a significantly large content thereof results in a cross-linked rubber having reduced cold resistance.

Examples of α,β-ethylenically unsaturated monocarboxylic acid ester monomers for forming the α,β-ethylenically unsaturated monocarboxylic acid ester monomer units (b) include (meth) acrylic acid esters (abbreviations for "methacrylic acid esters and acrylic esters". The same shall apply below.) having a $C_1$ to $C_{18}$ alkyl group, such as methyl acrylate, ethyl acrylate, n-butyl acrylate, isobutyl acrylate, n-dodecyl acrylate, methyl methacrylate, and ethyl methacrylate; (meth) acrylic acid esters having a $C_2$ to $C_{18}$ alkoxyalkyl group, such as methoxymethyl acrylate, methoxyethyl acrylate, ethoxypropyl acrylate, methoxybutyl acrylate, ethoxydodecyl acrylate, methoxyethyl methacrylate, methoxybutyl methacrylate, and ethoxypentyl methacrylate; (meth)acrylic acid esters having a $C_2$ to $C_{12}$ cyanoalkyl group such as α-cyanoethyl acrylate, α-cyanoethyl methacrylate, and cyanobutyl methacrylate; (meth) acrylic acid esters having a $C_1$ to $C_{12}$ hydroxyalkyl group, such as 2-hydroxyethyl acrylate, 2-hydroxypropyl acrylate, and 2-hydroxyethyl methacrylate; (meth)acrylic acid esters having a $C_1$ to $C_{12}$ fluoroalkyl group, such as trifluoroethyl acrylate and tetrafluoropropyl methacrylate; PEG (meth) acrylates; and the like.

Examples of PEG (meth)acrylates include compounds represented by General Formula (A):

[Chem. 1]

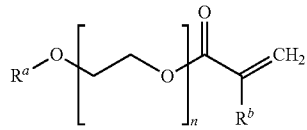

(A)

In General Formula (A) above, $R^a$ is a hydrogen atom or a branched or non-branched $C_1$ to $C_{20}$ alkyl group, preferably a methyl group, an ethyl group, a butyl group, or an ethylhexyl group. n is an integer of 1 to 8, preferably an integer of 2 to 8, more preferably an integer of 2 to 5, still more preferably 3. $R^b$ is a hydrogen atom or a methyl group.

"PEG" in "PEG (meth)acrylate" represents both of a monoethylene glycol moiety having one ethylene glycol unit (PEG-1; n=1) and a polyethylene glycol moiety having 2 to 8 ethylene glycol repeating units (PEG-2 to PEG-8; n=2 to 8).

Preferred PEG (meth)acrylates are compounds represented by the following formulae (B) to (K). In the following formulae (B) to (K), n is an integer of 1 to 8, preferably an integer of 2 to 8, more preferably an integer of 3 to 8, still more preferably 3.

[Chem. 2]

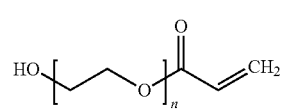

Formula (B))

Polyethylene glycol acrylate

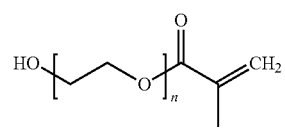

Formula (C))

Polyethylene glycol methacrylate

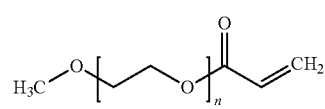

Formula (D))

Methoxypolyethylene glycol acrylate

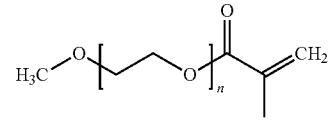

Formula (E))

Methoxypolyethylene glycol methacrylate

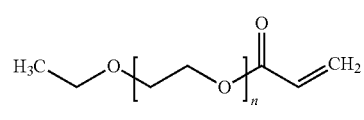

Formula (F))

Ethoxypolyethylene glycol acrylate

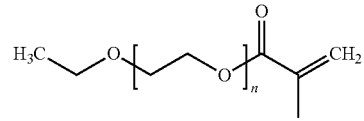

Formula (G))

Ethoxypolyethylene glycol methacrylate

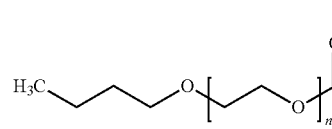

Formula (H))

Butoxypolyethylene glycol acrylate

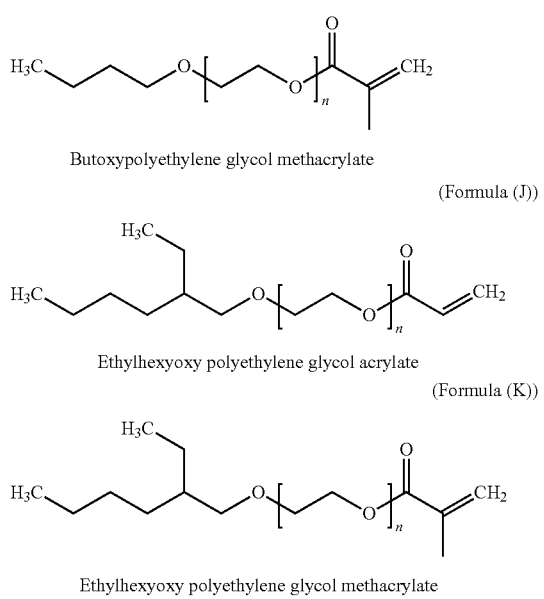

Formula (I): Butoxypolyethylene glycol methacrylate

Formula (J): Ethylhexyoxy polyethylene glycol acrylate

Formula (K): Ethylhexyoxy polyethylene glycol methacrylate

Examples of other generic names for methoxypolyethylene glycol acrylate (the above formula (D)) include poly(ethylene glycol) methyl ether acrylate, acryloyl-PEG, methoxy-PEG acrylate, methoxy poly(ethylene glycol) monoacrylate, poly (ethylene glycol) monomethyl ether monoacrylate, and mPEG acrylate.

These PEG (meth)acrylates are commercially available, and are sold by Arkema under the trade name Sartomer (registered trademark), by Evonik under the trade name Visiomer (registered trademark), and by Sigma Aldrich.

Among these, preferred are (meth)acrylic acid esters having a $C_1$ to $C_{18}$ alkyl group and (meth)acrylic acid esters having a $C_2$ to $C_{18}$ alkoxyalkyl group, more preferred are n-butyl acrylate and 2-methoxyethyl methacrylate, and particularly preferred is 2-methoxyethyl methacrylate because these can contribute to further enhanced cold resistance and resistance to swelling in oil of the resulting cross-linked rubber. From the viewpoint of particularly enhanced resistance to swelling in oil, (meth)acrylic acid esters having a $C_1$ to $C_{18}$ alkyl group are preferred, and from the viewpoint of particularly enhanced cold resistance, (meth)acrylic acid esters having a to Cm alkoxyalkyl group are preferred. These α,β-ethylenically unsaturated monocarboxylic acid ester monomers may be used alone or in combination.

The content of α,β-ethylenically unsaturated monocarboxylic acid ester monomer units (b) in the nitrile-group-attaining copolymer rubber according to the present invention is 10 to 50% by weight, preferably 15 to 45% by weight, more preferably 20 to 40% by weight, still more preferably 25 to 35% by weight, particularly preferably 26 to 30% by weight in the total monomer units. A significantly small content of α,β-ethylenically unsaturated monocarboxylic acid ester monomer units (b) results in a cross-linked rubber having reduced cold resistance and/or reduced resistance to swelling in oil. In contrast, a significantly large content thereof results in a cross-linked rubber having reduced resistance to swelling in oil.

Examples of a conjugated diene monomer for forming the conjugated diene monomer units (c) inducts 1,3-butadiene, isoprene, 2,3-dimethyl-1,3-butadiene, 1,3-pentadiene, and the like.

The content of conjugated diene monomer units (c) in the nitrile-group-containing copolymer rubber according to the present invention is 22 to 74% by weight, preferably 25 to 65% by weight, more preferably 30 to 55% by weight, still more preferably 40 to 50% by weight, particularly preferably 42 to 48% by weight in the total monomer units. A significantly small content of conjugated diene monomer units (c) results in a cross-linked rubber having reduced rubber elasticity. In contrast, a significantly large content thereof results in a cross-linked rubber having impaired heat resistance and/or impaired chemical stability. In the nitrile-group-containing copolymer rubber according to the present invention, the conjugated diene monomer units (c) are at least partially hydrogenated. For this reason, the above content of conjugated diene monomer units (c) also includes that including hydrogenated units.

The nitrile-group-containing copolymer rubber according to the present invention comprises at least isoprene units as conjugated diene monomer units (c), and the proportion of isoprene units in the conjugated diene monomer units (c) is in the range of 5% by weight or more and less than 33% by weight. The isoprene units contained in the nitrile-group-containing copolymer rubber according to the present invention are also at least partially hydrogenated. Thus, the above content thereof also includes that of hydrogenated isoprene units therein. According to the present invention, by controlling the proportion of isoprene units in the conjugated diene monomer units (c) within the above range, the cold resistance, resistance to swelling in oil, and resistance to hardening in oil of the resulting cross-linked rubber can be highly balanced, and especially the cold resistance can be further improved. By controlling the proportion of isoprene units in the conjugated diene monomer units (c) within the above range, hydrogenation of the conjugated diene monomer units (c) is allowed to relatively easily proceed. Thereby, a desired iodine value can be obtained with even a small amount of a relatively expensive hydrogenation catalyst, and thus, high heat resistance can be attained with high productivity. In the nitrile-group-containing copolymer rubber according to the present invention, the proportion of isoprene units in the conjugated diene monomer units (c) is preferably 10% by weight or more and less than 33% by weight, more preferably 15 to 30% by weight, still more preferably 19 to 30% by weight, further still more preferably 21 to 30% by weight, particularly preferably 24 to 30% by weight, most preferably 24 to 28% by weight because the resulting cross-linked rubber can have further enhanced resistance to hardening in oil.

Although the nitrile-group-containing copolymer rubber according to the present invention may comprise isoprene units in the above proportion and units formed of one or more conjugated diene monomers other than the isoprene units as the conjugated diene monomer units (c), to provide a cross-linked rubber having a better balance between the resistance to hardening in oil and the cold resistance in particular, the nitrile-group-containing copolymer rubber preferably comprises isoprene units and 1,3-butadiene units as the conjugated diene monomer units (c).

The proportion of units formed of the conjugated diene monomer (s) other than isoprene units in tike conjugated diene monomer units (c) is more than 67% by weight and 95% by weight or less, preferably more than 67% by weight and 90% by weight or less, more preferably 70 to 85% by weight, still more preferably 70 to 81% by weight, further still more preferably 70 to 79% by weight, particularly preferably 70 to 76% by weight, most preferably 72 to 76% by weight.

In the nitrile-group-containing copolymer rubber according to the present invention, it is sufficient that the proportion of isoprene units in the conjugated diene monomer units (c) is within the above range. The proportion of isoprene units in the nitrile-group-containing copolymer rubber according to the present invention (the proportion of isoprene units in the total monomer units forming the nitrile-group-containing copolymer rubber) is preferably 1 to 20% by weight, more preferably 5 to 15% by weight, still more preferably 5 to 9% by weight. By controlling the proportion of isoprene units in the nitrile-group-containing copolymer rubber within the above range, the cold resistance can be further enhanced.

Any carboxyl group-containing monomer can be used to form the carboxyl group-containing monomer units (d) as long as it is copolymerizable with the α,β-ethylenically unsaturated nitrile monomer and has one or more unsubstituted, e.g., unesterified (free) carboxyl groups. Use of the carboxyl group-containing monomer enables introduction of carboxyl groups into the nitrile-group-containing copolymer rubber according to the present invention.

Examples of the carboxyl group-containing monomer used in the present invention include α,β-ethylenically unsaturated monocarboxylic acid monomers, α,β-ethylenically unsaturated polyvalent carboxylic acid monomers, α,β-ethylenically unsaturated dicarboxylic acid monoester monomers, and the like. The carboxyl group-containing monomer also includes these monomers in which carboxyl groups thereof form carboxylic acid salts. Furthermore, anhydrides of α,β-ethylenically unsaturated polyvalent carboxylic acids can also be used as the carboxyl group-containing monomer because carboxyl groups are formed by cleavage of the acid anhydride group thereof after copolymerization.

Examples of α,β-ethylenically unsaturated monocarboxylic acid monomers include acrylic acid, methacrylic acid, ethylacrylic acid, crotonic acid, cinnamic acid, and the like.

Examples of α,β-ethylenically unsaturated polyvalent carboxylic acid monomers include butenedioic acids such as fumaric acid and maleic acid, itaconic acid, citraconic acid, mesaconic acid, glutaconic acid, allylmalonic acid, teraconic acid, and the like. Examples of anhydrides of α,β-unsaturated polyvalent carboxylic acids include maleic anhydride, itaconic anhydride, citraconic anhydride, and the like.

Examples of α,β-ethylenically unsaturated dicarboxylic acid monoester monomers include maleic acid monoalkyl esters such as monomethyl maleate, monoethyl maleate, monopropyl maleate, and mono-n-butyl maleate; maleic acid monocycloalkyl esters such as monocyclopentyl maleate, monocyclohexyl maleate, and monocycloheptyl maleate; maleic acid monoalkyl cycloalkyl esters such as monomethyl cyclopentyl maleate and monoethyl cyclohexyl maleate; fumaric acid monoalkyl esters such as monomethyl fumarate, monoethyl fumarate, monopropyl fumarate, and mono-n-butyl fumarate; fumaric acid monocycloalkyl esters such as monocyclopentyl fumarate, monocyclohexyl fumarate, and monocycloheptyl fumarate; fumaric acid monoalkyl cycloalkyl esters such as monomethyl cyclopentyl fumarate and monoethyl cyclohexyl fumarate; citraconic acid monoalkyl esters such as monomethyl citraconate, monoethyl citraconate, monopropyl citraconate, and mono-n-butyl citraconate; citraconic acid monocycloalkyl esters such as monocyclopentyl citraconate, monocyclohexyl citraconate, and monocycloheptyl citraconate; citraconic acid monoalkyl cycloalkyl esters such as monomethyl cyclopentyl citraconate and monoethyl cyclohexyl citraconate; itaconic acid monoalkyl esters such as monomethyl itaconate, monoethyl itaconate, monopropyl itaconate, and mono-n-butyl itaconate; itaconic acid monocycloalkyl esters such as monocyclopentyl itaconate, monocyclohexyl itaconate, and monocycloheptyl itaconate; itaconic acid monoalkyl cycloalkyl esters such as monomethyl cyclopentyl itaconate and monoethyl cyclohexyl itaconate; and the like.

These carboxyl group-containing monomers may be used alone or in combination. Among these carboxyl group-containing monomers, preferred are α,β-ethylenically unsaturated dicarboxylic acid monoester monomers, more preferred are α,β-ethylenically unsaturated dicarboxylic acid monoalkyl ester monomers, still more preferred are maleic acid monoalkyl esters, and particularly preferred is mono-n-butyl maleate because they ensure a more remarkable effect of improving the compression set resistance.

If the carboxyl group-containing monomer units (d) are contained, the content of carboxyl group-containing monomer units (d) in the nitrile-group-containing copolymer rubber according to the present invention is 1 to 10% by weight, preferably 2 to 9% by weight, more preferably 3 to 8% by weight, still more preferably 3 to 7% by weight in the total monomer units. A significantly small content of carboxyl group-containing monomer units (d) results in a cross-linked rubber having reduced resistance to hardening in oil. In contrast, a significantly large content thereof results in a cross-linked rubber having reduced resistance to swelling in oil. By controlling the content of carboxyl group-containing monomer units (d) within the above range, hydrogenation of the conjugated diene monomer units (c) is allowed to relatively easily proceed. Thereby, a desired iodine value can be obtained with even a small amount of a relatively expensive hydrogenation catalyst, and thus, high heat resistance can be attained with high productivity.

In addition to the α,β-ethylenically unsaturated nitrile monomer units (a), the α,β-ethylenically unsaturated monocarboxylic acid ester monomer units (b), the conjugated diene monomer units (c), and the carboxyl group-containing monomer units (d), the nitrile-group-containing copolymer rubber according to the present invention may comprise units of a different monomer copolymerizable with the monomers for forming these units. Examples of such a different monomer include ethylene, α-olefin monomers, aromatic vinyl monomers, fluorine-containing vinyl monomers, copolymerizable antioxidants, and the like.

Preferred α-olefin monomers are those having 3 to 12 carbon atoms, and examples thereof include propylene, 1-butene, 4-methyl-1-pentene, 1-hexene, 1-octene, and the like.

Examples of aromatic vinyl monomers include styrene, α-methylstyrene, vinylpyridine, and the like.

Examples of fluorine-containing vinyl monomers include fluoroethyl vinyl ether, fluoropropyl vinyl ether, o-trifluoromethylstyrene, vinyl pentafluorobenzoate, difluoroethylene, tetrafluoroethylene, and the like.

Examples of copolymerizable antioxidants include N-(4-anilinophenyl) acrylamide, N-(4-anilinophenyl)methacrylamide, N-(4-anilinophenyl) cinnamamide, N-(4-anilinophenyl) crotonamide, N-phenyl-4-(3-vinylbenzyloxy)aniline, N-phenyl-4-(4-vinylbenzyloxy)aniline, and the like.

The content of the different copolymerizable monomer units in the nitrile-group-containing copolymer rubber according to the present invention is preferably 50% by weight or less, more preferably 40% by weight or less, still more preferably 10% by weight or less in the total monomer units.

The nitrile-group-containing copolymer rubber according to the present invention has an iodine value of 120 or less, preferably 80 or less, more preferably 60 or less, still more preferably 50 or less, further still more preferably 15 or less, particularly preferably 9 or less. Although not particularly limited, the lower limit of the iodine value is usually 1 or more. A significantly large iodine value may result in a cross-linked rubber having reduced heat resistance and ozone resistance. According to the present invention, by controlling the content of isoprene units in the conjugated diene monomer units (c) within the above range, hydrogenation of the conjugated diene monomer units (c) is allowed to relatively easily proceed. Thereby, the iodine value within the above range can be obtained with even a small amount of a relatively expensive hydrogenation catalyst, and thus, high heat resistance (high heat resistance resulting freer, a reduced iodine value) can be attained with high productivity.

The polymer Mooney viscosity (ML1+4, 100° C.) of the nitrile-group-containing copolymer rubber according to the present invention is preferably 10 to 200, more preferably 15 to 150, still more preferably 15 to 100, particularly preferably 30 to 90. A polymer Mooney viscosity of 10 or more results in a cross-linked rubber having favorable mechanical properties. A polymer Mooney viscosity of 200 or less results in favorable processability of a cross-linkable rubber composition prepared by adding a cross-linking agent.

Although the method of producing the nitrile-group-containing copolymer rubber according to the present invention is not particularly limited, the nitrile-group-containing copolymer rubber can be prepared by copolymerizing the above-mentioned monomers, and hydrogenating carbon-carbon double bonds in the resulting copolymer. The polymerization method is not particularly limited, and may be a known method such as emulsion polymerization or solution polymerization. Preferred is emulsion polymerization iron the viewpoint of industrial productivity. During emulsion polymerization, polymerization additives usually used can be used in addition to an emulsifier, a polymerization initiator, and a molecular weight modifier.

Examples of the emulsifier include, but should not be limited to, nonionic emulsifiers such as polyoxyethylene alkyl ethers, polyoxyethylene alkyl phenol ethers, polyoxyethylene alkyl esters, and polyoxyethylene sorbitan alkyl esters; anionic emulsifiers such as salts of fatty acids such as myristic acid, palmitic acid, oleic acid, and linolenic acid, salts of alkylbenzene sulfonates such as sodium dodecylbenzenesulfonate, higher alcohol sulfuric acid ester salts, and alkyl sulfosuccinic acid salts; copolymerizable emulsifiers such as sulfoesters of α,β-unsaturated carboxylic acids, sulfate esters of α,β-unsaturated carboxylic acids, and sulfoalkyl aryl ethers; and the like. The amount of the emulsifier to be added is preferably 0.1 to 10 parts by weight, more preferably 0.5 to 5 parts by weight relative to 100 parts by weight of the monomers used in polymerization.

Any radical initiator can be used as the polymerization initiator without limitation. Examples thereof include inorganic peroxides such as potassium persulfate, sodium persulfate, ammonium persulfate, potassium perphosphate, and hydrogen peroxide; organic peroxides such as t-butyl peroxide, cumene hydroperoxide, p-menthane hydroperoxide, di-t-butyl peroxide, t-butylcumyl peroxide, acetyl peroxide, isobutyryl peroxide, octanoyl peroxide, dibenzoyl peroxide, 3,5,5-trimethylhexanoyl peroxide, and t-butylperoxy isobutyrate; azo compounds such as azobisisobutyronitrile, azobis-2,4-dimethylvaleronitrile, azobiscyclohexanecarbonitrile, and methyl azobisisobutyrate; and the like. These polymerization initiators can be used alone or in combination. Preferred polymerization initiators are inorganic or organic peroxides. If a peroxide is used as the polymerization initiator, a combination thereof with a reducing agent such as sodium bisulfite or ferrous sulfate can be used as a redox polymerization initiator. The amount of the polymerization initiator to be added is preferably 0.01 to 2 parts by weight relative to 100 parts by weight of the monomers used in polymerization.

Examples of the molecular weight modifier include, but should not be limited to, mercaptans such as t-dodecylmercaptan, n-dodecylmercaptan, and octylmercaptan; halogenated hydrocarbons such as carbon tetrachloride, methylene chloride, and methylene bromide; α-methylstyrene dimers; sulfur-containing compounds such as tetraethylthiuram disulfide, dipentamethylenethiuram disulfide, and diisopropyl xanthogen disulfide; and the like. These can be used alone or in combination. Among these, mercaptans are preferred, and t-dodecylmercaptan is more preferred. The amount of the molecular weight modifier to be used is preferably 0.1 to 0.8 parts by weight relative to 100 parts by weight of the monomers used in polymerization.

Water is usually used as a medium for emulsion polymerization. The amount of water is preferably 80 to 500 parts by weight, more preferably 80 to 300 parts by weight relative to 100 parts by weight of the monomers used in polymerization.

During emulsion polymerization, polymerization additives such as a stabilizer, a dispersant, a pH adjuster, a deoxidizer, and a particle size adjuster can be further used as needed. These additives can be used regardless of the type and amount thereof.

In the present invention, the resulting copolymer can be subjected to hydrogenation (hydrogenating reaction) as needed. Hydrogenation may be performed by a known method, and examples thereof include an oil layer hydrogenation method of coagulating a latex of a copolymer prepared through emulsion polymerization, and hydrogenating in an oil layer; an aqueous layer hydrogenation method of hydrogenating a latex of the resulting copolymer as it is; and the like.

If hydrogenation is performed by the oil layer hydrogenation method, suitably, the latex of the copolymer prepared by emulsion polymerization is subjected to coagulation by salting-out or with an alcohol, filtration, and drying, and then the solid is dissolved in an organic solvent. In the next step, the product is subjected to a hydrogenating reaction (oil layer hydrogenation), and the resulting hydride is added into a large amount of water, followed by coagulation, filtration, and drying. Thus, the nitrile-group-containing copolymer rubber according to the present invention can be prepared.

The latex can be coagulated by salting-out using a known coagulant such as sodium chloride, calcium chloride, aluminum sulfate, or the like. The coagulation may be performed using an alcohol such as methanol, instead of coagulation by salting-out. The solvent to be used in the oil layer hydrogenation method can be any liquid organic compound which dissolves the copolymer prepared through emulsion polymerization. Benzene, chlorobenzene, toluene, xylene, hexane, cyclohexane, tetrahydrofuran, methyl ethyl ketone, ethyl acetate, cyclohexanone, acetone, and the like are preferably used.

As a catalyst for the oil layer hydrogenation method, any known selective hydrogenation catalyst can be used. Preferred are palladium-based catalysts and rhodium-based catalysts, and more preferred are palladium-based catalysts (such as palladium acetate, palladium chloride, and palladium hydroxide). These may be used in combination. In such a case, a palladium catalyst is preferably used as a main active component. These catalysts are usually used as carried on carriers. Examples of the carriers include silica, silica-alumina, alumina, diatomite, activated carbon, and the like. The amount of the catalyst to be used is preferably 10 to 20000 ppm by weight, more preferably 100 to 15000 ppm by weight, still store preferably 500 to 9500 ppm by weight relative to the copolymer. If a palladium-based catalyst or a rhodium-based catalyst is used, the amount thereof may be controlled within the above range in terms of palladium or rhodium.

Alternatively, if hydrogenation is performed by the aqueous layer hydrogenation method, suitably, a latex of the copolymer prepared through emulsion polymerization is diluted with water as needed, and is subjected to a hydrogenating reaction. Examples of the aqueous layer hydrogenation method include an aqueous layer direct hydrogenation method of performing hydrogenation through feeding of hydrogen to a reaction system in the presence of a hydrogenation catalyst, an aqueous layer indirect hydrogenation method of performing hydrogenation through reduction in the presence of an oxidizing agent, a reducing agent, and an activating agent. Among these, preferred is the aqueous layer direct hydrogenation method.

In the aqueous layer direct hydrogenation method, the content of the copolymer in the aqueous layer (content in the form of a latex) is preferably 40% by weight or less to prevent aggregation. The hydrogenation catalyst can be any compound which hardly decomposes in the presence of water. Specific examples thereof include palladium catalysts such as palladium salts of carboxylic acids such as formic acid, propionic acid, lauric acid, succinic acid, oleic acid, and phthalic acid; palladium chlorides such as palladium chloride, dichloro(cyclocctadiene)palladium, dichloro(norbonadiene)palladium, and ammonium hexachloropalladate (IV); iodides such as palladium iodide; palladium sulfate dihydrate; and the like. Among these, particularly preferred are palladium salts of carboxylic acids, dichloro(norbonadiene) palladium, and ammonium hexachloropalladate (IV). The amount of the hydrogenation catalyst to be used may be appropriately used, and is preferably 5 to 20000 ppm by weight, more preferably 10 to 15000 ppm by weight relative to the copolymer prepared through polymerization.

In the aqueous layer direct hydrogenation method, the hydrogenation catalyst in the latex is removed after the hydrogenating reaction is completed. This removal operation can be performed, for example, using a method comprising adding an adsorbent such as activated carbon or an ion exchange resin to adsorb the hydrogenation catalyst under stirring, and then filtering or centrifuging the latex. The hydrogenation catalyst can be left in the latex, rather than removed.

In the aqueous layer direct hydrogenation method, the latex after the hydrogenating reaction is subjected to coagulation by salting-out, filtration, and drying. Thus, the nitrile-group-containing copolymer rubber according to the present invention can be prepared. In this case, the filtration and drying steps subsequent to coagulation can be performed by known methods.

Cross-Linkable Rubber Composition

The cross-linkable rubber composition according to the present invention comprises the nitrile-group-containing copolymer rubber according to the present invention and a cross-linking agent. The cross-linkable rubber composition according to the present invention may comprise two or more nitrile-group-containing copolymer rubbers as the nitrile-group-containing copolymer rubber according to the present invention. For example, nitrile-group-containing copolymer rubbers composed of different monomer units or having different proportions of monomer units can be used in appropriate combination. As one example, to provide highly balanced cold resistance and resistance to swelling in oil, a rubber containing $\alpha,\beta$-ethylenically unsaturated monocarboxylic acid ester monomer units (b) of a (meth)acrylic acid ester having a $C_1$ to $C_{18}$ alkyl group can be used in combination with that containing a (meth)acrylic acid ester having a $C_2$ to $C_{18}$ alkoxyalkyl group.

Any cross-linking agent which can cross-link the nitrile-group-containing copolymer rubber according to the present invention can be used without limitation. Examples thereof include sulfur cross-linking agents, organic peroxide cross-linking agents, polyamine cross-linking agents, and the like.

Examples of sulfur cross-linking agents include sulfur such as powdery sulfur, flowers of sulfur, precipitated sulfur, colloidal sulfur, surface-treated sulfur, and insoluble sulfur; sulfur-containing compounds such as sulfur chloride, sulfur dichloride, morpholine disulfide, alkylphenol disulfide, dibenzothiazyl disulfide, N,N'-dithio-bis(hexahydro-2H-azepin-2-one), phosphorus-containing polysulfide, and polymeric polysulfide; sulfur-donating compounds such as tetramethylthiuram disulfide, selenium dimethyldithiocarbamate, and 2-(4'-morpholinodithio)benzothiazole; and the like. These can be used alone or in combination.

Examples of organic peroxide cross-linking agents include dicumyl peroxide, cumene hydroperoxide, t-butyl-cumyl peroxide, paramenthane hydroperoxide, di-t-butyl peroxide, 1,3-bis(t-butylperoxyisopropyl) benzene, 1,4-bis-(t-butylperoxyisopropyl)benzene, 1,1-di-t-butylperoxy-3,3-trimethylcyclohexane, 4,4-bis-(t-butyl-peroxy)-n-butyl valerate, 2,5-dimethyl-2,5-di-t-butylperoxyhexane, 2,5-dimethyl-2,5-di-t-butylperoxyhexane-3,1,1-di-t-butylperoxy-3, 5,5-trimethylcyclohexane, p-chlorobenzoyl peroxide, t-butylperoxyisopropyl carbonate, t-butylperoxy benzoate, and the like. These can be used alone or in combination.

Any polyamine cross-linking agent may be used as long as it is a compound having two or more amino groups or is converted into a form having two or more amino groups during cross-linking. Preferred are compounds having an aliphatic hydrocarbon or aromatic hydrocarbon with an amino group or a hydrazide structure (structure represented by —CONHNH$_2$, where CO represents a carbonyl group) replacing a plurality of hydrogen atoms and compounds which are converted into such a form during cross-linking.

Specific examples of polyamine cross-linking agents include aliphatic polyvalent amines such as hexamethylenediamine, hexamethylenediamine carbamate, N,N-dicinnamylidene-1,6-hexanediamine, tetramethylenepentamine, and hexamethylenediamine cinnamaldehyde adducts; aromatic polyvalent amines such as 4,4-methylenedianiline, m-phenylenediamine, 4,4-diaminodiphenyl ether, 3,4-diaminophenyl ether, 4,4-(m-phenylenediisopropylidene)dianiline, 4,4-(p-phenylenediisopropylidene)dianiline, 2,2-bis[4-(4-aminophenoxy)phenyl]propane, 4,4-diaminobenzanilide, 4,4-bis(4-aminophenoxy)biphenyl, m-xylylenediamine, p-xylylenediamine, and 1,3,5-benzenetriamine; and polyvalent hydrazides such as dihydrazide isophthalate, dihydrazide terephthalate, dihydrazide phthalate, dihydrazide 2,6-naphthalenedicarboxylate, dihydrazide naphthalate, dihydrazide oxalate, dihydrazide malonate, dihydrazide succinate, dihydrazide glutamate, dihydrazide adipate, dihydrazide pimelate, dihydrazide suberate, dihydrazide azelate, dihydrazide sebacate, dihydrazide brassylate, dihydrazide dodecanedioate, dihydrazide acetonedicarboxylate, dihydrazide fumarate, dihydrazide maleate, dihydrazide itaconate, dihydrazide trimellitate, dihydrazide 1,3,5-benzenetricarboxylate, dihydrazide aconitate, and dihydrazide pyromellitate. Among these, preferred are aliphatic polyvalent amines and aromatic polyvalent amines, more preferred are hexamethylenediamine carbamate and 2,2-bis[4-(4-aminophenoxy)phenyl]propane, and particularly preferred is hexamethylenediamine carbamate because these can more significantly enhance the effects of the present invention.

Although not particularly limited, the content of the cross-linking agent in the cross-linkable rubber composition according to the present invention is preferably 0.1 to 20 parts by weight, more preferably 1 to 15 parts by weight relative to 100 parts by weight of the nitrile-group-containing copolymer rubber.

If a polyamine cross-linking agent is used as the cross-linking agent, it is preferred that a basic cross-linking accelerator be further contained.

Specific examples of basic cross-linking accelerators include compounds represented by General Formula (1), basic cross-linking accelerators having a cyclic amidine structure, guanidine basic cross-linking accelerators, aldehyde amine basic cross-linking accelerators, and the like:

$$R^1-NH-R^2 \quad (1)$$

(where $R^1$ and $R^2$ each independently represent a $C_1$ to $C_{12}$ alkyl group optionally having a substituent or a $C_5$ to $C_{12}$ cycloalkyl group optionally having a substituent).

$R^1$ and $R^2$ each are a $C_1$ to $C_{12}$ alkyl group optionally having a substituent or a $C_5$ to $C_{12}$ cycloalkyl group optionally having a substituent, preferably a $C_5$ to $C_{12}$ cycloalkyl group optionally having a substituent, particularly preferably a $C_5$ to $C_8$ cycloalkyl group optionally having a substituent.

Preferably, $R^1$ and $R^2$ have no substituent.

If $R^1$ and $R^2$ have a substituent, specific examples of the substituent include hydroxyl, alkoxy, alkoxycarbonyl, and amino groups, halogen atoms, and the like.

Among these compounds represented by General Formula (1), more preferred are compounds represented by General Formula (2) to further enhance the processability and the scorching stability:

$$R^3-NH-R^4 \quad (2)$$

(where $R^3$ and $R^4$ each independently represent a $C_5$ to $C_8$ cycloalkyl group optionally having a substituent).

$R^3$ and $R^4$ each are a $C_5$ to $C_8$ cycloalkyl group optionally having a substituent, preferably a $C_5$ or $C_6$ cycloalkyl group optionally having a substituent, more preferably a $C_6$ cycloalkyl group optionally having a substituent.

Preferably, $R^3$ and $R^4$ have no substituent.

If $R^3$ and $R^4$ each have a substituent, specific examples of the substituent include hydroxyl, alkoxy, alkoxycarbonyl, and amino groups, halogen atoms, and the like.

Specific examples of the compounds represented by General Formula (1) include dicycloalkylamines such as dicyclopentylamine, dicyclohexylamine, and dicycloheptylamine; secondary amines whose nitrogen atom is bonded to an alkyl group and a cycloalkyl group, such as N-methylcyclopentylamine, N-butylcyclopentylamine, N-heptylcyclopentylamine, N-octylcyclopentylamine, N-ethylcyclohexylamine, N-butylcyclohexylamine, N-heptylcyclohexylamine, and N-octylcyclooctylamine; secondary amines whose nitrogen atom is bonded to a hydroxy group-containing alkyl group and a cycloalkyl group, such as N-hydroxymethylcyclopentylamine and N-hydroxybutylcyclohexylamine; secondary amines whose nitrogen atom is bonded to an alkoxy group-containing alkyl group and a cycloalkyl group, such as N-methoxyethylcyclopentylamine and N-ethoxybutylcyclohexylamine; secondary amines whose nitrogen atom is bonded to an alkoxycarbonyl group-containing alkyl group and a cycloalkyl group, such as N-methoxycartonylbutylcyclopentylamine and N-methoxycarbonylheptylcyelchexylamine; secondary amines whose nitrogen atom is bonded to an amino group-containing alkyl group and a cycloalkyl group, such as N-aminopropylcyclopentylamine and N-aminoheptylcyclohexylamine; secondary amines whose nitrogen atom is bonded to a halogen atom-containing cycloalkyl group, such as di(2-chlorocyclopentyl)amine and di(3-chlorocyclopentyl)amine; and the like. To further enhance the processability and the scorching stability, preferred are dicycloalkyl amines, more preferred are dicyclopentylamine and dicyclohexylamine, and particularly preferred is dicyclohexylamine.

Examples of basic cross-linking accelerators having a cyclic amidine structure include 1,6-diazabicyclo[5,4,0]undecene-7 (hereinafter, abbreviated to "DBU" in sane cases), 1,5-diazabicyclo[4,3,0]nonene-5 (hereinafter, abbreviated to "DEN" in some cases), 1-methylimidazole, 1-ethylimidazole, 1-phenylimidazole, 1-benzylimidazole, 1,2-dimethylimidazole, 1-ethyl-2-methyl imidazole, 1-methoxyethyl imidazole, 1-phenyl-2-methylimidazole, 1-benzyl-2-methylimidazole, 1-methyl-2-phenylimidazole, 1-methyl-2-benzylimidazole, 1,4-dimethylimidazole, 1,5-dimethylimidazole, 1,2,4-trimethylimidazole, 1,4-dimethyl-2-ethylimidazole, 1-methyl-2-methoxyimidazole, 1-methyl-2-ethoxyimidazole, 1-methyl-4-methoxyimidazole, 1-methyl-2-methoxyimidazcle, 1-ethoxymethyl-2-methylimidazole, 1-methyl-4-nitroimidazole, 1,2-dimethyl-5-nitroimidazole, 1,2-dimethyl-5-aminoimidazole, 1-methyl-4-(2-aminoethyl) imidazole, 1-methylbenzimidazole, 1-methyl-2-benzylbenzimidazole, 1-methyl-5-nitrobenzimidazole, 1-methyl imidazoline, 1,2-dimethyl imidazoline, 1,2,4-trimethylimidazoline, 1,4-dimethyl-2-ethylimidazoline, 1-methyl-phenylimidazoline, 1-methyl-2-berizylimidazoline, 1-methyl-2-ethoxyimidazoline, 1-methyl-2-heptylimidazoline, 1-methyl-2-undecylimidazoline, 1-methyl-2-heptadecylimidazoline, 1-methyl-2-ethoxymethylimidazoline, 1-ethoxymethyl-2-methylimidazoline, and the like. Among these basic cross-linking accelerators having a cyclic amidine structure, preferred are 1,8-diazabicyclo[5,4,0]undecene-7 and 1,5-diazabicyclo[4,3,0]nonene-5, and more preferred is 1,8-diazabicyclo[5,4,0]undecene-7.

Examples of guanidine basic cross-linking accelerators include tetramethylguanidine, tetraethylguanidine, diphenyl guanidine, 1,3-di-ortho-tolylguanidine, orthotolylbiguanide, and the like.

Examples of aldehyde amine basic cross-linking accelerators include n-butyl aldehyde aniline, acetaldehyde ammonia, and the like.

Among these basic cross-linking accelerators, preferred are the compounds represented by General Formula (1), the guanidine basic cross-linking accelerators, and the basic cross-linking accelerators having a cyclic amidine structure, and more preferred are the compounds represented by General Formula (1) and the basic cross-linking accelerators having a cyclic amidine structure.

The compounds represented by General Formula (1) may be mixed with alcohols such as alkylene glycols and $C_5$ to $C_{20}$ alkyl alcohols, or such mixtures may further contain art inorganic acid and/or an organic acid. The compounds represented by General Formula (1) may form (a) salt(s) with an inorganic acid and/or an organic acid, and may further form a composite with an alkylene glycol. The basic cross-linking accelerators having a cyclic amidine structure may form a salt with an organic carboxylic acid, an alkyl phosphoric acid, or the like.

If the basic cross-linking accelerator is compounded, the compounding amount thereof in the cross-linkable rubber composition according to the present invention is preferably 0.1 to 20 parts by weight, more preferably 0.2 to 15 parts by weight, still more preferably 0.5 to 10 parts by weight relative to 100 parts by weight of the nitrile-group-containing copolymer rubber.

Besides the above components, the following compounding agents usually used in the rubber field can also be compounded with the cross-linkable rubber composition according to the present invention: for example, reinforcing agents such as carbon black and silica, fillers such as calcium carbonate, talc, and clay, metal oxides such as zinc oxide and magnesium oxide, α,β-ethylenically unsaturated carboxylic acid metal salts such as zinc methacrylate and zinc acrylate, co-cross-linking agents, cross-linking aids, cross-linking retarders, antiaging agents, antioxidants, light stabilizers, scorch retardants such as primary amines, activating agents such as diethylene glycol, celling agents, plasticizers, processing aids, slip agents, adhesives, lubricants, flame retardants, antifungal agents, acid acceptors, antistatic agents, pigments, foaming agents, and the like. These compounding agents car; be compounded in any expounding amounts according to the purpose of compounding within the ranges not impairing the object and effects of the present invention.

Examples of coupling agents include silane coupling agents, aluminum-based coupling agents, titanate-based coupling agents, and the like.

Specific examples of silane coupling agents include, but should not be limited to, sulfur-containing silane coupling agents such as γ-mercaptopropyl trimethoxysilane, γ-mercaptomethyltrimethoxysilane, γ-mercaptomethyltriethoxysilane, γ-mercaptohexarnethyldisilazane, bis(3-triethoxysilylpropyl) tetrasulfane, and bis(3-triethoxysilylpropyl) disulfane; epoxy group-containing silane coupling agents such as γ-glycidoxypropyltrimethoxysilane, γ-glycidoxypropylmethyldimethoxysilane, β-(3,4-epoxycyclohexyl) ethyltrimethoxysilane, γ-mercaptopropyltrimethoxysilane, and γ-glycidoxypropylmethyldiethoxysilane; amino group-containing silane coupling agents such as N-(β-aminoethyl)-γ-aminopropyltrimethoxysilane, γ-aminopropyltrimethoxysilane, γ-aminopropyltriethoxysilane, N-2-(aminoethyl)-3-aminopropyltrimethoxysilane, N-2-(aminoethyl)-3-aminopropyltriethoxysilane, 3-triethoxysilyl-N-(1,3-dimethyl-butylidene) propylamine, and M-phenyl-3-aminopropyltrimethoxysilane; (meth)acryloxy group-containing silane coupling agents such as γ-methacryloxypropyltrimethoxysilane, γ-methacryloxypropyltris((β-methoxyethoxy)silane, γ-methacryloxypropylmethyldimethoxysilane, γ-methacryloxypropylmethyldiethoxysilane, γ-methacryloxypropyltriethoxysilane, and γ-acryloxypropyltrmeathoxysilane; vinyl group-containing silane coupling agents such as vinyl trimethoxysilane, vinyltriethoxysilane, vinyltris(β-methoxyethoxy) silane, vinyltrichlorosilane, and vinyltriacetoxysilane; chloropropyl group-containing silane coupling agents such as 3-chloropropyltriroethoxysilane; isocyanate group-containing silane coupling agents such as 3-isocyanateprcpyltriethoxysilane; styryl group-containing silane coupling agents such as p-styryltrimethoxysilane; ureido group-containing silane coupling agents such as 3-ureidopocpyltriethoxysilane; allyl group-containing silane coupling agents such as diailyldimethylsilane; alkoxy group-containing silane coupling agents such as tetraethoxysilane; phenyl group-containing silane coupling agents such as diphenyldimethoxysilane; fluoro group-containing silane coupling agents such as trifluoropropyltrimethoxysilane; alkyl group-containing silane coupling agents such as isobutyl trimethoxysilane and cyclohexybrethyldimethoxysilane; and the like.

Specific examples of aluminum-based coupling agents include, but should not be limited to, acetoalkoxyaluminum diisopropylate.

Specific examples of titanate-based coupling agents include, but should not be limited to, isopropyltriisostearoyl titanate, isopropyltris(dioctylpyrophosphate) titanate, isopropyltri (N-aminoethyl-aminoethyl) titanate, tetraoctylbis (ditridecylphosphite) titanate, tetra(2,2-diallyloxymethyl-1-butyl)bis(ditridecyl)phosphite titanate, bis (dioctylpyrtphosphate) oxy acetate titanate, bis (dioctylpyrophosphate)ethylene titanate, tetraisopropylbis (dioctylphosphite) titanate, isopropyltriisostearoyl titanate, and the like. These silane coupling agents, aluminum-based coupling agents, titanate-based coupling agents, and the like can be used alone or in combination.

Examples of carton black include furnace black, acetylene black, thermal black, channel black, austin black, graphite, and the like. These can be used alone or in combination.

Examples of silica include natural silicas such as quartz and silica stone powder; synthetic silicas such as anhydride silicic acid (such as silica gel and Aerosil) and hydrous silicic acid; and the like. Among these, preferred are synthetic silicas. These silicas may be surface treated with a coupling agent or the like. For example, the above-mentioned coupling agents can be used in the surface treatment.

Although not particularly limited, preferred co-cross-linking agents are low-molecular or polymeric compounds each having several radically reactive unsaturated groups in the molecule. Examples thereof include polyfunctional vinyl car pounds such as divinylbenzene and divinylnaphthalene; isocyanurates such as triallyl isocyanurate and trimethallyl isocyanurate; cyanurates such as triallyl cyanurate; maleimides such as N,N'-m-phenylenedimleimide; allyl esters of polyvalent acids such as diallyl phthalate, diallyl isophthalate, diallyl maleate, diallyl fumarate, diallyl sebacate, and triallyl phosphate; diethylene glycol bisallyl carbonate; allyl ethers such as ethylene glycol diallyl ether, triallyl ether of trimethylolpropane, and partial allyl ether of pentaerythrite; allyl modified resins such as allyl a ted novolak and allylated resol resins; tri- to pentafunctional methacrylate compounds and acrylate compounds such as trimethylolpropane trimethacrylate and trimethylolpropane triacrylate; and the like. These can be used alone or in combination.

Any plasticizer can be used without limitation: for example, trimellitic acid plasticizers, pyromellitic acid plasticizers, ether ester plasticizers, polyester plasticizers, phthalic acid plasticizers, adipic acid ester plasticizers, phosphoric acid ester plasticizers, sebacic acid ester plasticizers, alkylsulfonic acid ester compound plasticizers, epoxidated vegetable oil plasticizers, and the like. Specific examples thereof include tri-2-ethylhexyl trimellitate, trimellitic acid isononyl ester, trimellitic acid mixed linear alkyl esters, dipentacrythritol esters, pyromellitic acid 2-ethylhexyl ester, polyether ester (molecular weight: about 300 to 5000), bis[2-(2-butoxyethoxy)ethyl] adipate, dioctyl adipate, adipic acid polyester (molecular weight: about 300 to 5000), dioctyl phthalate, diisononyl phthalate, dibutyl phthalate, tricresyl phosphate, dibutyl sebacate, alkylsulfonic acid phenyl esters, epoxidized soybean oil, diheptanoate, di-2-ethylhexanoate, didecanoate, and the like. These can be used alone or in combination.

Furthermore, a rubber other than the above-mentioned nitrile-group-containing copolymer rubber according to the present invention may be compounded with the cross-linkable rubber composition according to the present invention in the range not impairing the effects of the present invention.

Examples of such a rubber include acrylic rubber, ethylene-acrylic acid copolymer rubber, styrene-butadiene copolymer rubber, polybutadiene rubber, ethylene-propylene copolymer rubber, ethylene-propylene-diene ternary copolymer rubber, epichlorohydrin rubber, fluorocarbon rubber, urethane rubber, chloroprene rubber, silicone rubber, natural rubber, polyisoprene rubber, and the like.

If the rubber other than the nitrile-group-containing copolymer rubber according to the present invention is compounded, the compounding amount thereof in the cross-linkable rubber composition is preferably 30 parts by weight or less, more preferably 20 parts by weight or less, still more preferably 10 parts by weight or less relative to 100 parts by weight of the nitrile-group-containing copolymer rubber according to the present invention.

The cross-linkable rubber exposition according to the present invention can be prepared by mixing the above components preferably in a nonaqueous system. Although the cross-linkable rubber composition according to the present invention can be prepared by any method without limitation, the cross-linkable rubber composition according to the present invention can be usually prepared as follows: The components other than the cross-linking agent and thermally unstable components are primarily kneaded with a mixer such as a Banbury mixer, an intermixer, a kneader, or the like. The kneaded product is transferred to an open roll mill or the like. The cross-linking agent and the thermally unstable components are added, and the mixture is secondarily kneaded. Primary kneading is performed at a temperature of usually 10 to 200° C., preferably 30 to 180° C. for 1 minute to 1 hour, preferably 1 minute to 30 minutes. Secondary kneading is performed at a temperature of usually 10 to 90° C., preferably 20 to 60° C. for 1 minute to 1 hour, preferably 1 minute to 30 minutes.

Cross-Linked Rubbers

The cross-linked rubber according to the present invention is prepared by cross-linking the above-mentioned cross-linkable rubber composition according to the present invention.

The cross-linked rubber according to the present invention can be prepared as follows: The cross-linkable rubber composition according to the present invention is formed using a forming machine having a desired shape, such as an extruder, an injection molding machine, a compressor, or a roll, is subjected to a cross-linking reaction by heating, and then is solidified into a cross-linked rubber. In this case, the composition may be cross-linked after preliminary forming, or may be formed and cross-linked at the same time. The forming temperature is usually 10 to 200° C., preferably 25 to 120° C. The cross-linking temperature is usually 100 to 200° C., preferably 130 to 19° C., and the cross-linking time is usually 1 minute to 24 hours, preferably 2 minutes to 1 hour.

Depending on the shape, the size, and the like thereof, the cross-linked rubber may be insufficiently cross-linked in its inside although cross-linked on its surface. For this reason, the cross-linked rubber may be further heated for secondary cross-linking.

The heating method nay be appropriately selected from standard methods used to cross-link rubber, such as press heating, steam heating, oven heating, and hot air heating.

The cross-linked rubber according to the present invention thus obtained is prepared using the above-mentioned nitrile-group-containing copolymer rubber according to the present invention, and has high cold resistance, high resistance to swelling in oil (small volume change in oil), and high resistance to hardening in oil (small hardness change in an oil containing a condensed aromatic compound).

For this reason, utilizing such properties, the cross-linked rubber according to the present invention can be used in broad applications: for example, a variety of sealing materials such as O-rings, packings, diaphragms, oil seals, shaft seals, bearing seals, wellhead seals, sleek absorber seals, air compressor seals, seals for sealing Freon, fluorohydrocarbons, or carbon dioxide used in compressors for cooling apparatuses of air conditioners and refrigerating machines of air-conditioning systems, seals for sealing supercritical carbon dioxide or subcritical carbon dioxide used as washing media for precision cleaning, seals for roller devices (such as roller bearings, automotive hub units, automotive water pumps, linear guide devices, and ball screws), valves and valve sheets, blow out preventers (BOPs), and bladders; a variety of gaskets such as an intake manifold gasket attached to a connection between an intake manifold and a cylinder head, a cylinder head gasket attached to a connection between a cylinder block and a cylinder head, a rocker cover gasket attached to a connection between a rocker cover and a cylinder head, an oil pan gasket attached to a connection between an oil pan and a cylinder block or a transmission case, a gasket for fuel cell separators attached between a pair of housings which sandwich a unit cell including a positive electrode, an electrolyte plate, and a negative electrode, and a gasket for top covers for hard disk drives; a variety of rolls such as printing rolls, ironmaking rolls, papermaking rolls, industrial rolls, and office equipment rolls; a variety of belts such as flat belts (such as film core flat belts, cord flat belts, laminated flat belts, and single flat belts), V-belts (such as wrapped V-belts and low edge V-belts), V-ribbed belts (such as single V-ribbed belts, double V-ribbed belts, wrapped V-ribbed belt, rubber-backed V-ribbed belts, and top cog V-ribbed belts), CVT belts, timing belts, toothed belts, and conveyor belts; a variety of hoses such as fuel hoses, turbo air hoses, oil hoses, radiator hoses, heater hoses, water hoses, vacuum brake hoses, control hoses, air conditioner hoses, brake hoses, power steering hoses, air hoses, marine hoses, risers, and flow lines; a variety of boots such as CVJ boots, propeller shaft boots, constant-velocity joint boots, and rack, and pinion toots; attenuating member rubber parts such as cushion materials, dynamic dampers, rubber couplings, air airings, vibration insulators, and clutch facing materials; dust covers, automotive interior members, friction materials, tires, covered cables, shoe soles, electromagnetic wave shields adhesives such as adhesives for flexible printed circuit boards, fuel cell separators, as well as in the field of electronics.

EXAMPLES

The present invention will now be described more specifically by way of Examples and Comparative Examples. In each example, the term "parts" is weight-based unless otherwise specified. Note that the tests and the evaluations were carried out as follows.

Carboxyl Group Content 100 mL of 2-butanone was added to 0.2 g of a 2-mm square nitrile-group-containing copolymer rubber, followed by stirring for 16 hours. Then 20 mL of ethanol and 10 mL of water were added. Under stirring, titration was performed at room temperature using a 0.02 N hydrous ethanol solution of potassium hydroxide and thymolphthalein as an indicator. Thereby, the carboxyl group content (unit: ephr) was determined as the number of moles of carboxyl groups relative to 100 g of rubber.

Iodine Value

The iodine value of each nitrile-group-containing copolymer rubber was measured according to JIS K 6235.

Composition of Nitrile-Group-Containing Copolymer Rubber

The proportions of the monomer units forming each nitrile-group-containing copolymer rubber were measured by the following method. Specifically, the proportions of mono-n-butyl maleate units and methacrylic acid units were calculated as follows: The number of moles of carboxyl groups relative to 100 g of the nitrile-group-containing copolymer rubber after hydrogenation was determined by the above measurement method described in "Carboxyl group content", and the determined number of moles thereof was converted into the content of mono-n-butyl maleate units or that of methacrylic acid units.

The proportions of 1,3-butadiene units (including hydrogenated units) and isoprene units (including hydrogenated units) were measured by the following method. Specifically, first, the iodine value of the nitrile-group-containing copolymer rubber before hydrogenation was measured by the above method, and the total content of these units was calculated. Then, the weight ratio between these units was determined by $^1$H-NMR measurement.

The proportion of acrylonitrile units was calculated by measuring the nitrogen content in the nitrile-group-containing copolymer rubber after hydrogenation by the Kjeldahl method according to JIS K6384.

The proportion of 2-methoxyethyl acrylate units was calculated as the balance of the above monomer units.

Test for Resistance to Swelling in Oil

Each cross-linkable rubber composition was placed into a metal mold of 15 cm in length, 15 cm in width, and 0.2 cm in depth, and was press-formed at 170° C. for 20 minutes while a press pressure of 10 MPa was being applied. Thus, a sheet-shaped cross-linked product was prepared. In the next step, the resulting cross-linked product was transferred to a gear oven, and was subjected to secondary cross-linking at 170° C. for 4 hours to prepare a sheet-shaped cross-linked rubber. According to JIS K6258, a test for resistance to swelling in oil was performed by immersing the sheet-shaped cross-linked rubber in a test fuel oil (CE-20; mixture of isooctane, toluene, and ethanol in a volume ratio of 40:40:20) adjusted to 40° C. for 168 hours.

In the test for resistance to swelling in oil, the volumes of the cross-linked rubber before and after immersion in the fuel oil were measured, and the volume swelling rate $\Delta V$ (unit: %) after immersion in the fuel oil was calculated from "$\Delta V$=([volume after immersion in fuel oil]−[volume before Immersion in fuel oil]/[volume before immersion in fuel oil])×100". The resistance to swelling in oil was evaluated based on the calculated volume swelling rate $\Delta V$. A lower volume swelling rate $\Delta V$ indicates higher resistance to swelling in oil.

Test for Resistance to Hardening in Oil

A sheet-shaped cross-linked rubber was prepared in the same manner as in the test for resistance to swelling in oil. Separately from this, 10% by weight of phenanthrene was dissolved in a mixed solution (Fuel C:ethanol=80:20 (volume ratio)) of Fuel C (mixture of isooctane and toluene in a volume ratio of 50:50) and ethanol to prepare a phenanthrene-containing test fuel oil.

Using an international rubber hardness degree tester (IRHD method), the sheet-shaped cross-linked rubber prepared above was measured for hardness according to JIS K6253. In the next step, at 60° C., the sheet-shaped cross-linked rubber prepared above was immersed for 168 hours in the phenanthrene-containing test fuel oil prepared above. The cross-linked rubber was then taken out from the phenanthrene-containing test fuel oil, was dried at 120° C. for 3 hours, and then was further left to stand under a roan temperature condition for 24 hours. Thereafter, the hardness thereof was again measured under the same conditions as above. Then, the hardness change $\Delta Hs$ was determined from "hardness change $\Delta Hs$=(hardness after immersion in fuel oil)−(hardness before immersion in fuel oil)". A smaller absolute value of the hardness change $\Delta Hs$ indicates a smaller change in hardness caused by immersion in the test fuel oil, and indicates higher resistance to hardening in oil.

Cold Resistance Test (TR Test)

A sheet-shaped cross-linked rubber was prepared in the same manner as in the above-mentioned test for resistance to swelling in oil, and the cold resistance of the cross-linked rubber was measured by a low-temperature retraction test (TR test) according to JIS K6261. Specifically, an extended cross-linked rubber was frozen, and the recovery ratio of the extended cross-linked rubber was measured while the temperature was being continuously increased. The temperature TR10 at which the length of the test piece was contracted (recovered) by 10% due to the temperature increase was measured. A lower TR10 indicates higher cold resistance.

Example 1

Production of Nitrile-Group-Containing Copolymer Rubber (n1)

180 parts of deionized water, 25 parts of a 10% aqueous solution of sodium dodecyibenzenesulfonate, 25 parts of acrylonitrile, 36 parts of 2-methoxyethyl acrylate, 3 parts of mono-n-butyl maleate, and 0.75 parts of t-dodecylmercaptan (molecular weight modifier) were sequentially added to a reactor, the gas inside thereof was purged with nitrogen 3 times, and then 30 parts of 1,3-butadiene and 6 parts of isoprene were placed thereinto. The reactor was kept at 10° C., 0.1 parts of cumene hydroperoxide (polymerization initiator) and appropriate amounts of a reducing agent and a chelating agent were placed thereinto. The polymerization reaction was continued under stirring. When the polymerization conversion ratio reached 80%, 0.2 parts of a 5% by weight hydroquinone aqueous solution (polymerization terminator) was added to terminate the polymerization reaction. In the next step, residual monomers were removed at a water temperature of 60° C. to prepare a latex (solids content: 25% by weight) of a nitrile-group-containing copolymer rubber (X1) before hydrogenation.

Then, the latex of the nitrile rubber (X1) and a palladium catalyst (a mixed solution of a 1% by weight palladium acetate acetone solution with an equal weight of deionized water) were added in an autoclave such that the palladium content was 4,000 ppm by weight relative to the dry weight of the rubber contained in the latex of the nitrile-group-containing copolymer rubber (X1) before hydrogenation prepared above. A hydrogenating reaction was then performed at a hydrogen pressure of 3 MPa and a temperature of 50° C. for 6 hours to prepare a latex of a nitrile-group-containing copolymer rubber (n1).

2-Fold volume of methanol was added to the resulting latex of the nitrile-group-containing copolymer rubber (n1) to coagulate the latex, followed by vacuum drying at 60° C. for 12 hours to yield a solid nitrile-group-containing copolymer rubber (n1). The resulting nitrile-group-containing copolymer rubber (n1) had an iodine value of 8. The monomer composition of the nitrile-group-containing copolymer rubber (n1) was composed of 26% by weight of acrylonitrile units, 7% by weight of isoprene units (including hydrogenated units), 35% by weight of 1,3-butadiene units (including hydrogenated units), 28% by weight of 2-methoxyethyl acrylate units, and 4% by weight of mono-n-butyl maleate units.

Preparation of Cross-Linkable Rubber Composition

Using a Banbury mixer, 50 parts of FEF carton (trade name "SEAST SO", available from Tokai Carbon Co., Ltd., carbon black), 1 part of tri-2-ethylhexyl trimellitate (trade name "ADEKA CIZER C-8", available from ADEKA Corporation, plasticizer), 1 part of an isononyl trimellitate ester (trade name "ADEKA CIZER C-9N", available from ADEKA Corporation), 1 part of a polyether ester plasticizer (trade name "ADEKA CIZER RS-700", available from ADEKA Corporation), 1 part of a polyether ester plasticizer (trade name "ADEKA CIZER RS-735", available from ADEKA Corporation), 1 part of an adipic acid ether ester plasticizer (trade name "ADEKA CIZER RS-107", available from ADEKA Corporation), 1 part of stearic acid (cross-linking aid), 5 parts of zinc oxide (two types of zinc flowers, available from Seido Chemical Industry CO., Ltd.), 1.5 parts of 4,4'-di-α,α'-dimethylbenzyl)diphenylamine (trade name "NOCRAC CD", available from Ouchi Shinko Chemical Industrial CO., Ltd., antioxidant), and 1.5 parts of the zinc salt of 2-mercaptobenzimidazole (trade name "NOCRAC MBZ", available from Ouchi Shinko Chemical Industrial Co., Ltd., antioxidant) were added to and kneaded with 100 parts of the nitrile-group-containing copolymer rubber (n1) prepared above. In the next step, the mixture was transferred to a roll, and 8 parts of 1,3-bis(t-butylperoxyisopropyl) benzene (40% product) (trade name "VulCup 40KE", available from Arkema S.A., organic peroxide cross-linking agent) was added, and the mixture was kneaded to prepare a cross-linkable rubber composition.

By the above-mentioned method, a cross-linked rubber was prepared from the cross-linkable rubber composition prepared above. The resulting cross-linked rubber was subjected to the test for resistance to hardening in oil, the test for resistance to swelling in oil, and the cold resistance test. The results are shewn in Table 1.

Examples 2 to 5

Preparation of Nitrile-Group-Containing Copolymer Rubbers (n2) to (n5)

Nitrile-group-containing copolymer rubbers (n2) to (n5) were prepared in the same manner as in Example 1 except that the monomers used in polymerization and the compounding amounts thereof were varied as shown in Table 1 and the amount of the palladium catalyst used in the hydrogenating reaction was varied as shown in Table 1. The iodine values and monomer compositions of the nitrile-group-containing copolymer rubbers (n2) to (n5) are shown in Table 1.

In Example 5, methacrylic acid was added after addition of acrylonitrile and 2-methoxyethyl acrylate.

Preparation of Cross-Linkable Rubber Composition

Cross-linkable rubber compositions were prepared in the same manner as in Example 1 except that the nitrile-group-containing copolymer rubbers (n2) to (n5) prepared above were used instead of the nitrile-group-containing copolymer rubber (n1), and were evaluated in the same manner as in Example 1. The results are shown in Table 1.

Example 6

Preparation of Cross-Linkable Rubber Composition

A cross-linkable rubber composition was prepared by the following method using the nitrile-group-containing copolymer rubber (n2) prepared in Example 2 above.

Specifically, using a Banbury mixer, 50 parts of FEF carbon (trade name "SEAST SO", available from Tokai Carbon Co., Ltd., carbon black), 1 part of tri-2-ethylhexyl trimellitate (trade name "ADEKA CIZER C-8", available from ADEKA Corporation, plasticizer), 1 part of an isononyl trimellitate ester (trade name "ADEKA CIZER C-9N", available from ADEKA Corporation), 1 part of a polyether ester plasticizer (trade name "ADEKA CIZER RS-700", available from ADEKA Corporation), 1 part of a polyether ester plasticizer (trade name "ADEKA CIZER RS-735", available from ADEKA Corporation), 1 part of an adipic acid ether ester plasticizer (trade name "ADEKA CIZER RS-107", available from ADEKA Corporation), 1 part of stearic acid, 1 part of an polyoxyethylene alkyl ether phosphoric acid ester (trade name "Phosphanol RL210", available from Toho Chemical Industry, Co., Ltd., processing aid), and 1.5 parts of 4,4'-di-(α,α'-dimethylbenzyl)diphenylamine (trade name "NOCRAC CD", available from Ouchi Shinko Chemical Industrial Co., Ltd., antioxidant) were added to and kneaded with 100 parts of the nitrile-group-containing copolymer rubber (n2) prepared in Example 2. In the next step, the mixture was transferred to a roll, and 4 parts of 1,8-diazabicyclo[5,4,0]undecene-7 (DBU) (trade name: "RHENOGRAN XIA-60 (GE2014)", available from Rhein Chemie Corporation, a product composed of 60% by weight of DEU (including a fraction which is zinc dialkyldiphosphate salt), and an acrylic acid polymer and a dispersant (40% by weight in total), basic cross-linking accelerator), and 2.6 parts of hexanethylenediamine carbamate (trade name "Diak #1", available from E. I. du Pont de Nemours and Company, polyamine cross-linking agent belonging to aliphatic polyvalent amines) were added to and kneaded with the mixture to prepare a cross-linkable rubber composition.

Comparative Examples 2 to 5

Preparation of Nitrile-Group-Containing Copolymer Rubbers (n6) to (n10)

Nitrile-group-containing copolymer rubbers (n6) to (n10) were prepared in the same manner as in Example 1 except that the monomers used in polymerization and the compounding amounts thereof were varied as shown in Table 1 and the amount of the palladium catalyst in the hydrogenating reaction was varied as shewn in Table 1. The iodine values and monomer compositions of the resulting nitrile-group-containing copolymer rubbers (n6) to (n10) are shown in Table 1.

Preparation of Cross-Linkable Rubber Composition

Cross-linkable rubber compositions were prepared in the same manner as in Example 1 except that the nitrile-group-containing copolymer rubbers (n6) to (n10) prepared above were used instead of the nitrile-group-containing copolymer rubber (n1), and were evaluated in the same manner as in Example 1. The results are shewn in Table 1.

cates their higher cold resistance, higher resistance to swelling in oil, and higher resistance to hardening in oil (Examples 1 to 6). In addition, the results of Examples 1 to 6 reveal that by controlling the proportion of isoprene units in the conjugated diene monomer units (c) to 5% by weight or more and less than 33% by weight, a desired iodine value was obtained with even a small amount of a relatively expensive hydrogenation catalyst, thus attaining high heat resistance (high heat resistance resulting from a reduced iodine value) with high productivity.

In contrast, if the proportion of isoprene units in the conjugated diene monomer units (c) was 33% by weight or more, the resulting cross-linked rubbers had a relatively high TR10, which indicates their insufficient cold resistance (Comparative Examples 1 to 3).

TABLE 1

| | | Example | | | | | | Comparative Example | | | | |
|---|---|---|---|---|---|---|---|---|---|---|---|---|
| Nitrile-group-containing copolymer rubber | | 1 (n1) | 2 (n2) | 3 (n3) | 4 (n4) | 5 (n5) | 6 (n2) | 1 (n6) | 2 (n7) | 3 (n8) | 4 (n9) | 5 (n10) |
| Monomers used in polymerization | | | | | | | | | | | | |
| Acrylonitrile | (parts) | 25 | 24 | 24 | 20 | 20 | 24 | 23 | 23 | 23 | 26 | 26 |
| Isoprene | (parts) | 6 | 8 | 10 | 13 | 11 | 8 | 14 | 14 | 18.5 | 0 | 11 |
| 1,3-Butadien | (parts) | 30 | 28 | 27 | 27 | 28 | 28 | 24 | 24 | 19.5 | 37.5 | 34.5 |
| 2-Methoxyethyl acrylate | (parts) | 36 | 35 | 37 | 35 | 36 | 35 | 33 | 33 | 33 | 32 | 28.5 |
| Mono-n-butyl maleate | (parts) | 3 | 5 | 2 | 5 | | 5 | 6 | 6 | 6 | 4.5 | |
| Methacrylic acid | (parts) | | | | | 5 | | | | | | |
| Amount of palladium catalyst used during hydrogenation | (ppm by weight) | 4000 | 5000 | 7000 | 9000 | 8000 | 5000 | 7000 | 8500 | 10000 | 3000 | 10000 |
| Monomer composition of nitrile-group-containing copolymer rubber | | | | | | | | | | | | |
| Acrylonitrile unit | (wt %) | 28 | 25 | 25 | 21 | 21 | 25 | 24 | 24 | 24 | 27 | 27 |
| Isoprene unit (including saturated unit) | (wt %) | 7 | 9 | 11 | 14 | 12 | 8 | 16 | 16 | 22 | | 10 |
| 1,3-Butadiene unit (including saturated unit) | (wt %) | 35 | 33 | 34 | 33 | 34 | 33 | 30 | 30 | 24 | 41 | 43 |
| 2-Methoxyethyl acrylate unit | (wt %) | 28 | 27 | 28 | 26 | 27 | 27 | 23 | 23 | 23 | 27 | 20 |
| Mono-n-butyl maleate unit | (wt %) | 4 | 6 | 2 | 6 | | 6 | 7 | 7 | 7 | 5 | |
| Methacrylic acid unit | (wt %) | | | | | 6 | | | | | | |
| Proportion of isoprene unit in conjugated diene monomer unit | (wt %) | 16.7 | 21.4 | 24.4 | 29.8 | 26.1 | 21.4 | 34.8 | 34.8 | 47.8 | 0 | 18.9 |
| Iodine value of nitrile-group-containing copolymer rubber | | 8 | 14 | 8 | 8 | 8 | 14 | 20 | 14 | 10 | 7 | 12 |
| Cross-linking agent used in preparation of nitrile-group-containing copolymer rubber | | Peroxide-based | Peroxide-based | Peroxide-based | Peroxide-based | Peroxide-based | Peroxide-based | Peroxide-based | Peroxide-based | Peroxide-based | Peroxide-based | Peroxide-based |
| Test for resistance to swelling in oil | | | | | | | | | | | | |
| Volume swelling rate ΔV | (%) | 56 | 57 | 57 | 65 | 63 | 55 | 58 | 59 | 58 | 54 | 58 |
| Test for resistance to hardening in oil | | | | | | | | | | | | |
| Hardness change ΔHs | | 5 | 2 | 0 | −3 | −2 | 2 | −6 | −5 | −6 | 11 | 8 |
| Cold resistance test | | | | | | | | | | | | |
| TR10 | (° C.) | −30 | −29 | −27 | −25 | −26 | −29 | −22 | −21 | −19 | −25 | −28 |

Table 1 shows that if the cross-linked rubbers were prepared from the nitrile group-containing polymer robbers such that the contents of α,β-ethylenically unsaturated nitrile monomer units α,β-ethylenically unsaturated monocarboxylic acid ester monomer units (b), conjugated diene monomer units (c), and carboxyl group-containing monomer units (d) and the iodine value fell within the predetermined ranges specified in the present invention and the proportion of isoprene units in the conjugated diene monomer units (c) was 5% by weight or more and less than 33% by weight, the cross-linked rubbers exhibited a low; TR10, a small volume change in the oil, a small hardness change in the oil containing a condensed aromatic compound, which indi- Moreover, if the proportion of isoprene units in the conjugated diene monomer units (c) was less than 5% by weight or if the carboxyl group-containing monomer units (d) were not contained, the resulting cross-linked rubbers exhibited a large hardness change in the oil containing a condensed aromatic compound, which indicates their reduced resistance to hardening in oil (Comparative Examples 4 and 5).

The invention claimed is:

1. A nitrile-group-containing copolymer rubber, comprising 15% by weight or more and less than 28% by weight of α,β-ethylenically unsaturated nitrile monomer units (a), 10 to 50% by weight of α,β-ethylenically unsaturated monocarboxylic acid ester monomer units (b), 22 to 74% by weight of conjugated diene monomer units (c), and 1 to 10% by weight of carboxyl group-containing monomer units (d), and having an iodine value of 120 or less,
  wherein the conjugated diene monomer units (c) are at least partially hydrogenated, and the proportion of isoprene units in the conjugated diene monomer units (c) is 5% by weight or more and less than 33% by weight.

2. The nitrile-group-containing copolymer rubber according to claim 1, wherein the conjugated diene monomer units (c) comprise isoprene units and 1,3-butadiene units.

3. The nitrile-group-containing copolymer rubber according to claim 1, wherein the carboxyl group-containing monomer units (d) are α,β-ethylenically unsaturated dicarboxylic acid monoester monomer units.

4. The nitrile-group-containing copolymer rubber according to claim 1, wherein the α,β-ethylenically unsaturated monocarboxylic acid ester monomer units (b) are formed of a (meth) acrylic acid ester having a $C_2$ to $C_{18}$ alkoxyalkyl group.

5. A cross-linkable rubber composition, comprising the nitrile-group-containing copolymer rubber according to claim 1 and a cross-linking agent.

6. A cross-linked rubber prepared by cross-linking the cross-linkable rubber composition according to claim 5.

* * * * *